(No Model.)

W. H. GRUBB.
Device for Bending Metal Tubes.

No. 238,582. Patented March 8, 1881.

WITNESSES:
N. B. Brown
John C. Kenron

INVENTOR:
W. H. Grubb
BY
ATTORNEYS.

UNITED STATES PATENT OFFICE.

WILLIAM H. GRUBB, OF HANNIBAL, MISSOURI.

DEVICE FOR BENDING METAL TUBES.

SPECIFICATION forming part of Letters Patent No. 238,582, dated March 8, 1881.

Application filed April 26, 1880. (No model.)

*To all whom it may concern:*

Be it known that I, WILLIAM H. GRUBB, of Hannibal, in the county of Marion and State of Missouri, have made an Improvement in Devices for Bending Metal Pipe, of which the following is a full description.

Plumbers and others having occasion to bend gas or other wrought-iron pipe employ no device particularly adapted for such work, and, in fact, proceed by no regular plan or method in bending pipe of the smaller sizes—such, for instance, as are less than an inch or three-quarters of an inch in diameter. If very small the pipe is usually bent cold by hand. With large sizes the pipe is heated and the ordinary screw-vise brought into use, and also hammers, tongs, and other ordinary tools. The result is what might be expected—to wit, the pipe is seldom bent perfectly to the shape required, and if bent cold it is frequently buckled, crushed in, cracked, or split under the severe strain. By my improved method and device the work may be done quickly, accurately, and without danger of such injury to the pipe, and all the smaller sizes may be bent cold as well as if heated.

I will proceed to describe my invention by reference to accompanying drawings, in which—

Figure 1:
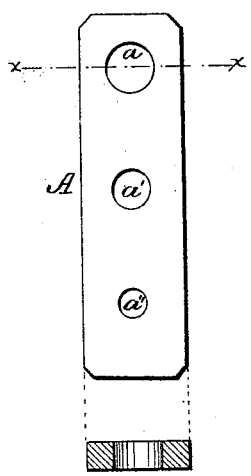
Figure 2:
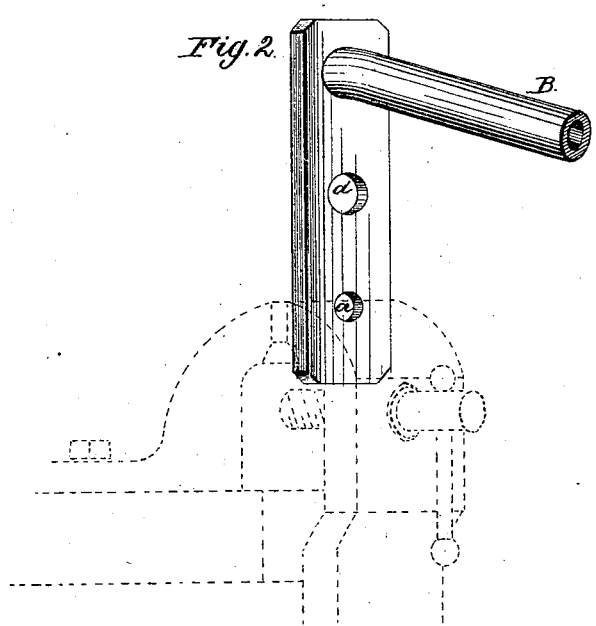
Figure 3:
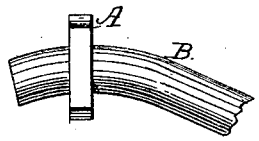
Figure 4:
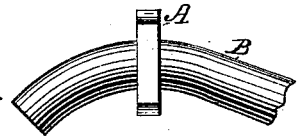
Figure 5:
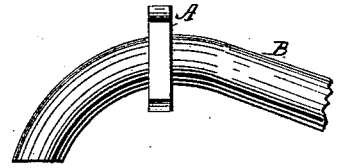
Figure 6:
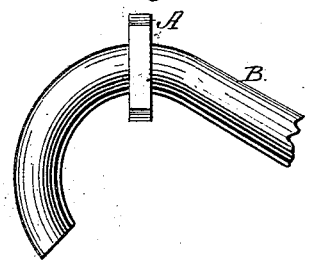
Figure 8:
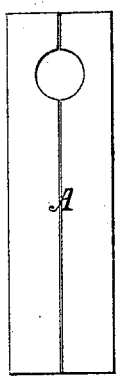
Figure 7:
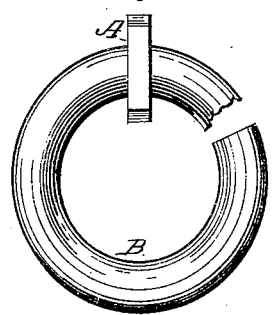

Figure 1 is a face view and a cross-section of the plate or device I employ in carrying out my method. Fig. 2 shows the same secured in upright position, and the end of a pipe inserted in one of its holes for the purpose of giving it the initiatory bend. Figs. 3 to 7, inclusive, are plan views, serving to represent the general progress of the bending operation from a slight curve to a circle. Fig. 8 is a face view of a bending-plate of modified construction.

The device I employ is a steel plate, A, having several holes, $a$ $a'$ $a''$, of different sizes. These holes are cylindrical, or have smooth parallel sides, which are perpendicular to the faces of the plate, and the holes are of the exact size required for standard sizes of pipe. In this instance I represent three holes, which are respectively adapted for one-eighth, one-fourth, and one-half inch pipe.

Suppose it be desired to bend a length of pipe, say of one-half inch diameter, I proceed as follows: The device A is first firmly secured, in vertical position, in a vise or other form of strong clamp, Fig. 1, the portion in which the half-inch hole $a$ is formed being uppermost, or at least located above the vise, so as to be accessible. One end of pipe B is then inserted in the hole $a$ and the pipe drawn gently toward or pushed from the workman at right angles to the axis of the hole. The extent to which the free end of the pipe is thus deflected toward the face of the plate obviously depends upon the degree of curvature it is desired to impart to it. The pipe is then pushed through the hole $a$ one-half inch, or thereabout, and the operation of drawing and bending repeated, thus producing the curve shown in Fig. 3. The pipe may then be projected through the hole far enough to seize it with the left hand, which facilitates the bending operation. The latter is continued, as above described and illustrated in the drawings, until the required curvature has been imparted. Thus by alternately bending the pipe laterally, or in a direction at right angles to the axis of the hole $a$, and drawing or pushing it through the hole after each bend, the operation is performed easily and quickly without any damage to the pipe, while the curve imparted to it is regular and exact.

It should be noted that the distance the pipe is to be drawn through the hole in the plate A after each bend depends mainly on the size of the pipe. It is indispensable to perfection of result that the pipe shall fit accurately in the hole through which it is passed, and that the hole shall have its opposite sides parallel throughout, as shown in Fig. 1. The axes of the holes are also preferably perpendicular to the faces of the plate.

In the aforesaid operation of bending pipe, it is prevented from buckling, crimping, or crushing in by reason of the fact that, being concentric with and fitting closely in the hole in the plate, it is supported at every point of its circumference within the hole during the application of the requisite leverage. In other words, the pipe being in contact with the sides of the hole at every point in the circumference of a portion of its length, it is prevented from bulging either laterally or vertically by the effect of the pressure incident to the bending operation, which pressure is distributed and, to a certain necessary extent, equalized around the pipe, where it would otherwise be crushed in, flattened, or otherwise distorted.

In Fig. 8 I show a bending-plate formed of two like parts—that is to say, divided longitudinally and centrally.

Thus the device is adapted to be easily applied to or removed from pipe, more especially pipe of the larger sizes, as will be obvious without further description.

Having thus described my invention, what I claim as new is—

The device described for bending pipes or tubes, used and manipulated in the manner set forth.

WILLIAM HARISON GRUBB.

Witnesses:
C. P. HEYWOOD,
LLEWELLYN W. BOSWELL.